United States Patent [19]

Gall

[11] Patent Number: 4,805,687

[45] Date of Patent: Feb. 21, 1989

[54] METHOD AND MACHINE FOR ALIGNING AND SECURING ROD SHAPED FASTENERS

[76] Inventor: Kenneth J. Gall, 1949 Shawnee Road, Windsor, Ontario, Canada, N8N 1S9

[21] Appl. No.: 1,365

[22] Filed: Jan. 8, 1987

[51] Int. Cl.$^4$ ............................................ B22D 19/04
[52] U.S. Cl. .................................. 164/461; 164/108
[58] Field of Search ............... 164/108, 109, 461, 419; 264/261, 277; 425/126 R, 126 S, DIG. 34, DIG. 201

[56] References Cited

U.S. PATENT DOCUMENTS

| | | | |
|---|---|---|---|
| 2,021,299 | 11/1935 | Gammeter | 425/DIG. 201 |
| 3,303,632 | 2/1967 | Halstead | 264/277 X |
| 3,432,985 | 3/1969 | Halstead | 264/277 X |
| 3,938,654 | 2/1976 | | 198/287 |
| 3,966,042 | 6/1976 | Shelton | 206/344 |
| 3,981,394 | 9/1976 | | 198/391 |
| 4,163,487 | 8/1979 | | 198/383 |
| 4,174,028 | 11/1979 | | 198/389 |
| 4,250,996 | 2/1981 | | 206/343 |
| 4,407,402 | 10/1983 | | 198/389 |
| 4,436,197 | 3/1984 | | 198/389 |
| 4,461,380 | 7/1984 | | 198/389 |
| 4,644,998 | 2/1987 | Mayer | 164/461 |

Primary Examiner—Kuang Y. Lin
Attorney, Agent, or Firm—Mitches & Co.

[57] ABSTRACT

A bonded strip of similar rod-like members like nails comprise a plurality of shanks aligned in an adjacent side-by-side flat parallel array, each shank having a longitudinal cylindrical shank. The shanks define at one end, a head of larger transverse dimension than the shank along most of the head transverse dimension while also communicating with a point on the circumference of the shank so that 2 adjacent nails so formed may be placed so that the shanks are preferably juxtaposed and are held by a bonding material surrounding each shank and interjoining the next with a meniscus so as to hold the strip rigid. The bonding material preferably has a melting temperature above ambient temperature during normal working conditions. In order to achieve the bonded strip the nails are collated into side-by-side relation with the flat head of one nail overlapping that of the other and preferably the head of each nail defining at least one point on the perimeter thereof of the nail that is coincident with the shank of the nail. A portion of the shank and tip of the nail are emmersed in a solution which solidifies at normal room temperature and thus acts as a rigid bonding agent to hold the nails juxtaposed, heads overlapping. The range so structured is rigid and the adhesive, if molten zinc, is on extremely cheap bonding agent.

8 Claims, 5 Drawing Sheets

METHOD AND MACHINE FOR ALIGNING AND SECURING ROD SHAPED FASTENERS

This invention relates to a method for aligning rod-like fastener members such as nails, screws, and the like into an oriented linear array and for binding, into a range, a pre-selected number of said members so that the range forms a rigid strip of members. If the members be nails, they subsequently may be placed into a magazine of a rapid-acting driving apparatus there to be injected by the rapid-acting driving apparatus into a work piece on command. The strip of rod-like fastener members is rigid, and have their shanks in side-by-side closely spaced parallel relationship, preferably juxtaposed, which when nails increases the number of nails able to be inserted into the magazine.

Particularly, the invention relates to collating identical longitudinal members such as nails, as they are produced by a forming machine.

BACKGROUND TO THE INVENTION

Those skilled in the art will appreciate that automatic nail driving devices, more generally known as rapid-acting driving apparatus, are commonly used in the construction trade for driving nails into work pieces. The actuating devices, not forming part of this invention, may be either pneumatically powered or otherwise, but they all feature a magazine into which a linear strip of nails is placed, each nail being "peeled off" from the strip by the actuating device each time the actuating device is activated.

In U.S. Pat. No. 3,966,042 issued June 29, 1976 by Shelton et al, a fastener strip is disclosed in which the adjacent side-by-side nails are held, closely spaced, in a side-by-side parallel array by means of a polyethylene or plastic carrier, which has been bonded to each adjacent nail such that when the nail is driven by the pneumatic nail driving apparatus, a portion of the carrier itself follows the nail into the work piece.

Other prior art nail strips, which are available, have the nails relatively aligned in side-by-side close spaced parallel relation, with the heads of an adjacent nail overlapping that of another, so that the strip forms 2 plane surfaces on opposite sides of the nail strip as disclosed by Shelton. In each of these surface planes there is either one or a pair of rod-like wires of diameter substantially less than that of the shank, each of the rods braised to each shank to thereby hold the nails into a continuous strip or range. The wire rods, not being of heavy cross-section, allow the strip of nails to bend and this sometimes causes jamming of the nails in the magazine during consumption and during collating operations. During consumption, of course, the wire rods must be either destroyed or consumed as by following each shank into the work piece. In the later case the wire must first be severed from the adjacent shank and expelled from the driving apparatus; either together with a shank, or at a later moment.

Attempts to overcome these difficulties include replacing the parallel wire rods on opposite surfaces with an adhesive ribbon sheet wherein the sheet is paper or polyethylene and has on one surface thereof an adhesive which is juxtaposed against the collated side-by-side shanks. Some of the driving devices which employ a range of nails so fabricated have difficulty in discharging the paper or polythylene sheet and the device clogs.

The invention has an one of its objects the elimination of a carrier or sheet material and the utilization of an adhesive or bonding agent which at normal or ambient room temperature is a solid, but which may be affixed to the nails in the liquid or molten state. On solidification of the bonding agent adjacent, side-by-side shanks are held rigidly together. The bonding agent works best, if the shanks are juxtaposed one to another. Molten zinc is a satisfactory adhesive that if allowed to solidify on adjacently (juxtaposed) disposed nails forms a meniscus band therebetween, the said meniscus interjoining one shank to the other and forming the means for rigidly constraining side-by-side shanks into a rigid arrangement. During consumption by the driving apparatus, the apparatus severs the meniscus and the nail with piece. There is thus no requirement to discard the carrier, adhesive, or sheet since no remnants are left in the magazine.

In one aspect of the invention thereof, I contemplate an improved bonded strip of similar rod-like members comprising a plurality of shanks aligned in an adjacent side-by-side flat parallel array, each shank defining at one end, a head of larger transverse dimension than the shank along most of the transverse dimension while communicating with a point on the perimeter of the head with the shank so that 2 adjacent members so formed may be placed so that the shanks are preferably juxtaposed and held by a bonding material surrounding each shank and interjoining the next with a meniscus so as to hold the strip rigid, the bonding material preferably having a melting temperature above normal or room temperature.

The prior art is replete with various devices and methods for collating rod-like elements such as nails and the like and for applying the paper and wire retainers, or the plastic surround of Shelton. Such prior art methods and devices require that the nails, after their fabrication and in collection in a bulk storage bin, are picked up and then forwarded to a cleaning station and onward to an interim storage station thereafter. Subsequently the nails are picked up again and placed into a tumbler and then poured into containers. Then the container contents are dumped into a threading station or collating station if smooth shanks are preferred, which in one aspect acts as source means for providing a continuous even supply of feed nails into a threader means that threads the nails into a parallel strip or alternately correlates them there. A typical prior art method and apparatus is that disclosed by Barnes in U.S. Pat. No. 4,174,028 issued Nov. 13, 1975 for a Method and Apparatus for Orienting and Storing Similar Articles, the particular method being preferably used to place the adhesive paper sheet on opposite parallel surfaces of the nails or screws that are first continuously fed from a bulk supply for collation into a range of side-by-side elements by the Barnes apparatus. The prior art requires various intermediate steps of material handling, storing, where each storing operation tends to damage some nails or screws as the case might be; spillage associated with storage, continuous feeding or nails from bulk storage prior to feeding, the threader or collator that arranges them in a parallel arrays of packages. (It is at the continuous feeding step in the prior art into the threader for collation that damaged nails or nails damaged by the collator are detected and removed.) Should the nails be fabricated by the nail fabricating machine in an improper or deformed manner since this is the first step of "quality control" in all likelihood all or most of the nails which have been stored in the bulk and interim storage bin will generally have to be discarded. This is wasteful and time consumming.

It is an object of the invention to overcome these problems by avoiding bulk storage of formed nails and providing a means for collating similar articles such as nails or screws immediately on their respective fabrication (as from the nail forming or screw forming device), while discarding prior to collation, damaged product, collating and binding acceptable elements into a parallel array or strip and if required subsequent packaging the strips for shipment.

It is a preferred object that the identical members be nails that have a flat head integral to one end of a cylindrical shank that tapers at its distal end into a point. The shank may have a smooth cylindrical surface or define thereon serrations or corregations or may even have a helix race thereabout. The shank surface is immaterial to the invention. The flat head however should have a mean transverse dimension greater than that of the shank, the head material being removed such as to allow juxtaposition of one shank adjacent the other. An appropriate adhesive that eventually solidifies, envelopes adjacent shanks and forms a rigid meniscus therebetween so as to form the range into a rigid strip of nails that can be conveniently inserted into a magazine of a rapid-acting fastener driving apparatus. The carrier adhesive preferably is a molten material such as zinc which solidifies at room temperature. Preferably the head is formed as a truncated disc that defines a chord that intersects at one point with the outside circumference of the shank while the balance of the disc overlays the shank; hence, is of a transverse dimension larger than that of the shank. The rigid array has the head of the next adjacent nail in a plane juxaposed to and parallel therewith so that the array has nail heads cascadingly overlapping each in a unique yet relatively adjacent parallel plane.

The invention contemplates therefore an improved bonded strip of similar rod-like fastener elements, each having a shank that is in alignment and in an adjacent side-by-side flat, parallel array, each shank defining at one end, a head of larger transverse dimension than the shank, the head on one shank overlying in part, the head of an adjacent shank and means for rigidly bonding adjacent shanks one to the other thereby forming the improved bonded strip. Particularly, the bonding agent is solidified zinc and the head of each shank has a larger transverse dimension than the shank for most of its dimension and preferably traces out the loci of points as its perimeter being that of a circle intersected by a chord that is tangential with the prolongation of the shank. The heads are overlayed with an adjacent head so preferably the shanks are juxtaposed.

The invention also templates a method of arranging into a rigid parallel array, a plurality of uniformly formed rod-shaped fastener elements, such as nails, comprising the steps of;

(a) conveying the said fasteners sequentially and spacially one behind the other along a first linear run (b) orienting the elements in a common direction respectively parallel one to the other along said first run;

(c) compacting the adjacent spacial distance of the elements so as to place adjacent elements into proximate, parallel relationship;

(d) immersing similar ends of parallel adjacent elements in a bonding agent so as to form a meniscus therebetween; and, (e) solidifying the meniscus so as to form, into a rigid parallel array, a plurality of said elements.

Particularly the method includes the step of immersing the similar ends in molten zinc and for cleaning excess molten zinc therefrom prior to the solidification of the zinc into the meniscus by the solidifying step (e). This is achieved generally by arranging the elements, during the compacting step (b) so as to depend in parallel relationship from a first run along which they progressively travel and progressively tilting each advancing nail along the run into a predetermined relative angle to its travel and preferably allowing the head to lead the shank thereby to cause each head of a preceding adjacent element to overlay the head of a succeeding element. When stacked in this fashion, a succeeding step immerses the shanks in parallel adjacent side-by-side relation in molten zinc and removes them in a similar fashion out of the bath, cleaning excess zinc from the respective surfaces while allowing the meniscus formed in the bath to cool and hence solidify the zinc; thus the rigid array is formed. Appropriately, a given number of elements may be severed.

The invention therefore contemplates a new apparatus for collating and for arranging in a rigid parallel array a predetermined number of uniformly formed rod-like fastener elements, such as nails, comprising;

(a) means for receiving in sequence rod-like fastener elements from a feed supply;

(b) conveying the fasteners along a first run in a linear fashion while orienting the rod-like fasteners into parallel alignment coincident with the direction of the run;

(c) means for applying a bonding agent onto adjacent elements during a second run so as to form a meniscus between adjacent elements; and, (d) means for solidifying the meniscus thereby to form the rigid parallel array of rod-like fastener elements.

The invention will now be described by way of example and reference to the accompanying drawings in which;

OVERVIEW OF THE PREFERRED EMBODIMENT

Figure 1:
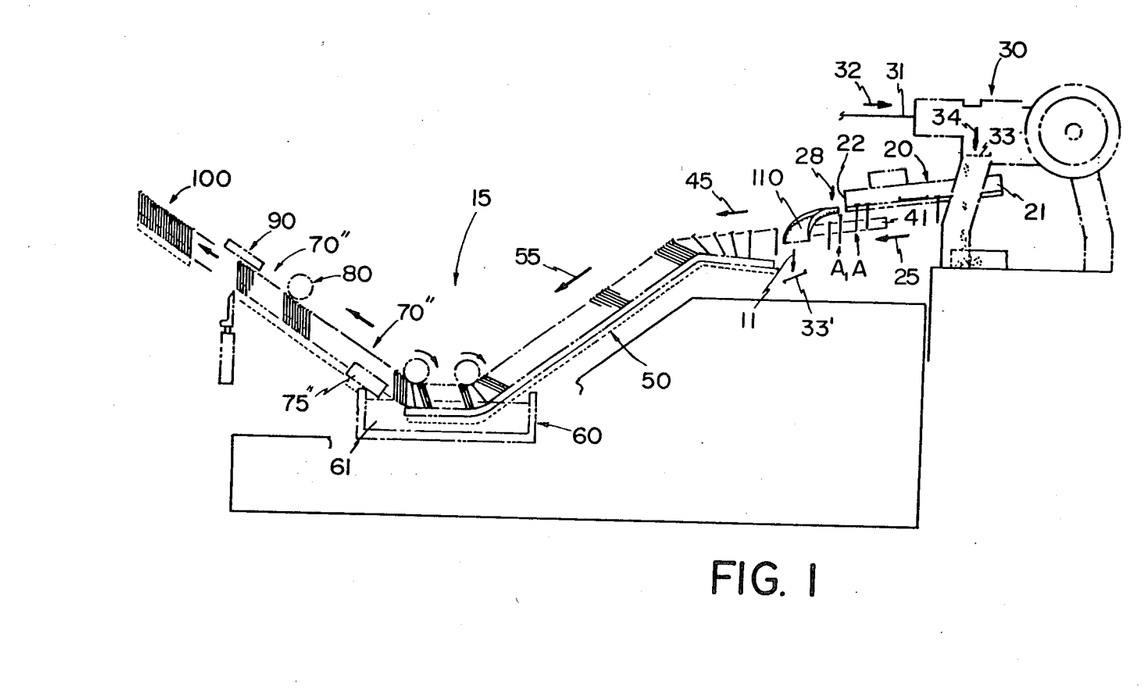
FIG. 1 is an elevation view of the apparatus and method for collating rod-shaped fasteners and for their fabrication into a range of parallely aligned fasteners according to the invention.
Figures 9, 10, 11, 12:
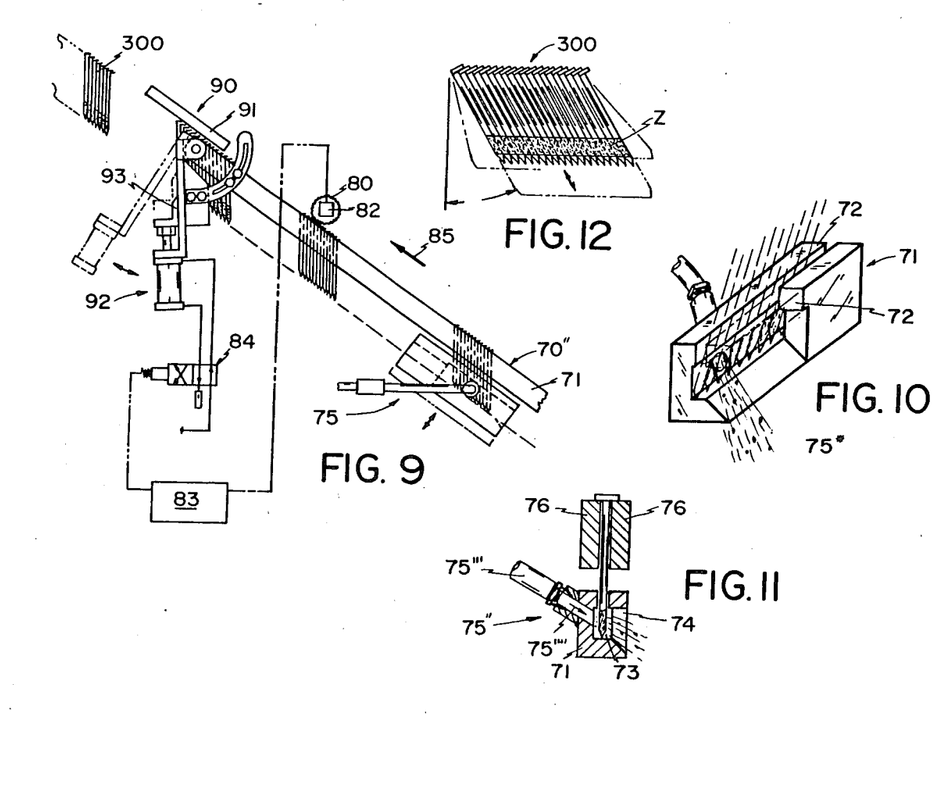
FIG. 9 shows the downstream upwardly inclined segment, in elevation, of the apparatus of FIG. 1 and the means of clearing excessive (liquid) adhesive for solidifying the adhesive and for severing into ranges a plurality of juxtaposed nails after the adhesive has solidified according to the invention.
FIG. 10 is a perspective view of the liquid adhesive cleaning components shown in FIG. 9.
FIG. 11 is an end view of FIG. 10.
FIG. 12 is an elevational view of the ultimate product after severance by the apparatus of the figures, a range of nails.

Referring to FIG. 1, a sorting, collating, adhesive appliance and element array forming apparatus according to the invention is shown generally as 15 and is located downstream and subjacent to a nail forming machine 30. The nail forming machine is according to the prior art and has an input orifice, not clearly shown, into which is fed a length of continuous wire rod 31 as its feed material. The wire rod 31 travels in the direction of arrow 32. Within the nail forming machine 30 nails 33 are formed and descend in the direction of arrow 34 to be collected subjacent the machine 30 by a sorting trough 30 being the most upstream element of my novel machine and apparatus 19. The sorting trough 20 is part of a first run for aligning and securing together a plurality of similar rod-shape elements in side-by-side relation as shown in FIG. 12.

My apparatus 15, therefore, includes a first run, an upstream, inclined sorting trough 20 whose lower discharge end 22 terminates above and in registry and alignment with a pair of fastener aligning racks 40 whose discharge end terminates the first run. Overlaying the racks 40 is an eliminator chute 110 for removing damaged nails. The aligning racks 40 terminate at the source end of a second run; namely, into a downwardly inclined elevator 50 formed as a pair of parallel members 51 that at their lower distal end curve into the horizontal at 52. As clearly seen in FIG. 1, the horizontal members 52 are immersed in an adhesive bath generally indicated as 60. In the preferred embodiment the bath contains molten zinc 61. The second run continues into an up-elevator generally shown as 70, in FIG. 1, that removes parallely aligned elements carrying molten zinc from the bath and passes them through a "blow-off" region generally shown as 71; thereafter through a counting station 80 and onward to an array separation station 90. Within the array separation station 90, a predetermined number, in my preferred embodiment 25 to 50 nails, having been previously counted by the counting station, are severed into a strip 100 forming the ultimate product of FIG. 12, of the invention.

DETAILS OF PREFERRED EMBODIMENT

Figures 2, 3, 3A:
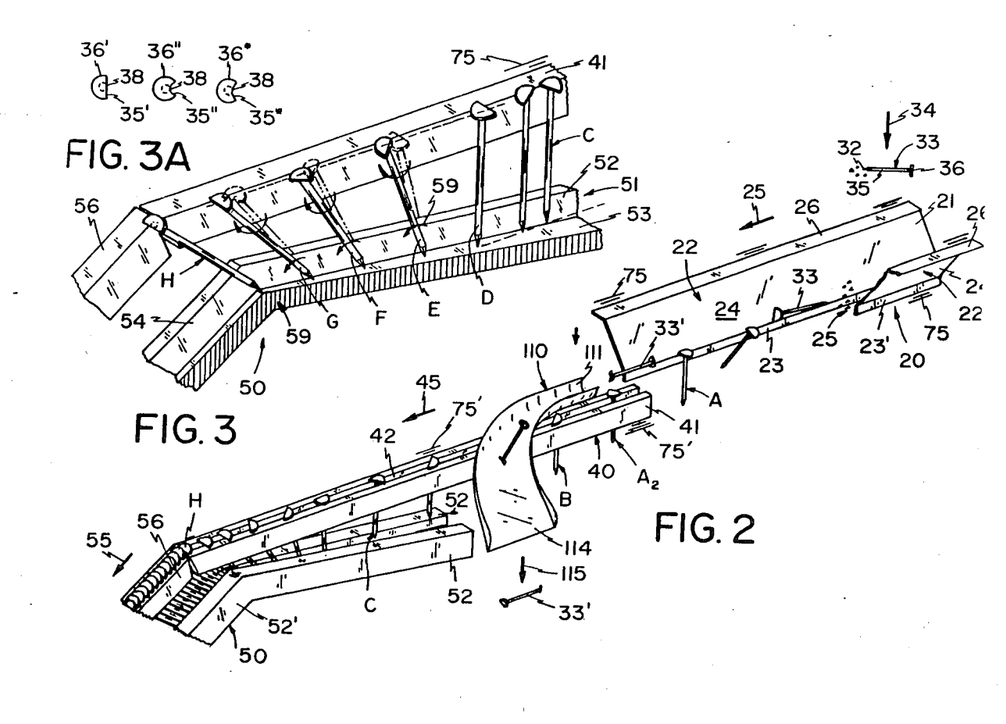
FIG. 2 is an exploded perspective view of the preliminary steps of collation according to the invention, including means for bad product rejection.
FIG. 3 and FIG. 3A are each exploded perspective views of the downstream portion of the apparatus according to FIG. 2.

Referring to FIGS. 1 and 2, the sorting trough 20 has its upstream end 21 located under the discharge orifice, not seen, of the nail forming machine 30 and receives thereat nails 33 as they are sequentially dropped and released from the nail forming machine 30. The nails 33 have a cylindrical shank 35 that at one end has a flat head 36 generally of larger transverse dimension than the shank, while the shank at its opposite or distal ends is tapered into a point 37. Preferably the head 36, and now referring to FIG. 3A, is such that at least at one point on the perimeter of the head 35, intersects with a point 38 on the circumference of the shank 35. As such one margin of the head may be a chord 35', or other arcuate configuration 35" and 35*. This configuration allows appropriate mating of adjacently aligned nails as will become apparent hereafter.

Figures 4, 5, 6:
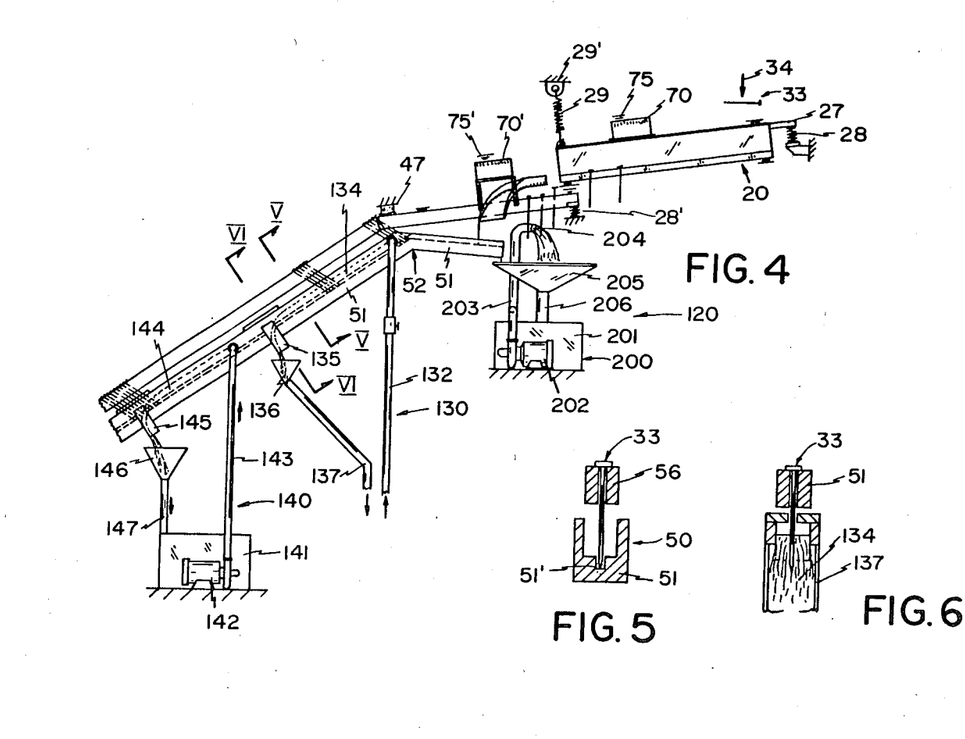
FIG. 4 is a more detailed section of the apparatus according to FIG. 1 showing the collating sequences.
FIGS. 5 and 6 respectively are sections along lines V—V and VI—VI respectively of FIG. 4.

The sorting trough 20 is of cross-sectional configuration in the shape of a "truncated yet open Y" with opposite arms formed as doglegs "](" wherein the apex of each arm is spacially juxtaposed from the other with each side having dogleg arm depending in the vertical thereby forming a channel 24 therebetween. Particularly, the opposite arms 22 have their vertical surfaces 23 of short dimension (about 2 cm.) and their inclined surfaces 24 of substantially greater dimension (about 8 cm.). The upper margin of the inclined surfaces 24 and 24' each terminate in a lateral extending margin 26. The vertical sheet pieces 23 and 23' thereby define as an open channel a longitudinal slot 25 that is sized larger than the diameter of the shank 35 of each nail, but smaller than the transverse head diameter 36. The laterally extending flanges 26 project forward into a single stachion 27 to hold and to rest on a coil spring 28. Similarly, the lower end 22 is carried by a coil spring 29 mounted to a rigid anchor 29'. A vibratory motor 70 is positioned somewhere along the sorting trough 20, for instance on its top as seen in FIG. 4 and imparts translatory motion indicated by the phantom line 75. This translatory motion vibrates the trough 20 and assists in carrying the nails 33 down the trough encourgaging the nail shank to fall through and depend from the slot 25, as shown at A in FIG. 2. If nails are improperly formed as at 33', the shanks will not depend as at A through the slot 25 but will slide down the trough 20 and will be carried away by the chute 110 as will be explained. The trough length is approximately 0.6 meters and the upper end 21 is at an elevation of approximately 4 cm higher than the discharge end 22. All the nails 33 produced by the nail forming machine therefore enter into the sorting trough 21 fall to the bottom and travel down the trough in the direction of arrow 25, while the good ones eventually have their shanks fall through and depend from the slot 25. Since the upper end of the slot 25 is subjacent the nail forming device 30, any scraps, as by chips from the nails points, produced by the device 30, fall through the slot 25 into a collection bin not shown.

In alignment with the slot 25 and part of the first run is an aligning channel 42 that is defined by a pair of fastener aligning racks 40. The aligning channel 42 is coincident with the slot 25 and the upstream portion of the aligning racks 40 is subjacent the discharge end 22 so that the shank of a nail 33, when in position $A_2$ not only extends through the slot 25 but also into the source end of channel 42 which is subjacent. This is a transition region for nail carry between the trough 20 and the aligning racks 40. It is in the aligning racks, as will become apparent, that the nail heads are oriented in a common direction as by rotating the nails, see FIG. 3, so that the cord 35" becomes the leading edge of the nail during its downwstream flow along the first run.

Referring to FIGS. 2 and 3 and the transition region of the first run, a curved discard chute 110 is placed with its upstream end 111 downstream and spaced apart from the discharge end 22 of the trough 20 so that the bottom 112 of the chute is coincident and in the same plane as the interfaces between faces 22 and margin 23. As such the damaged nail (33') cannot depend through the slot 25 and will travel as shown in FIG. 2 across the gap 120 onto the upstream portion 111 of the chute 110. As a result of the translatory motion 75 that is also imparted to the chute, since the chute is rigidly connected at 116 to the trough 20, the nail travels down the chute and falls at 115 into a discard box, not shown.

Subjacent the chute 110, at least in the upstream portion proximate the interface 111, the pair of rails 41 that act as fastener aligning racks 40 extend so that nails 33 easily pass through the transition region from position A to $A_1$, ($A'$ is the location when the nail 33 is in the gap 120 and is falling toward engagement with the upper surface of the aligning racks 40; then, prior to arriving at a location intermediate that of $A_2$ and B.)

The fastener aligning racks 40 are parallel rails 41, downwardly inclining, and define a downwardly travelling channel 42 for the shanks 35. The aligning racks 40 terminate at a lower discharge end into a corresponding pair of arms forming the down elevator 50 of the second run which carries downwardly, 55, juxtaposed and oriented nails with adjacent heads overlaying, into the molten zinc bath 61.

After the nails 33 are located in the alignment racks 40 at position B, migrate downwardly under the influence of vibration from the vibrator 70' through position C to position D where the tip 37 strikes the floorbed 53. Now referring to FIG. 3, at position D, since the height between the rail 41 and bed 53 diminishes there, the nail begins to tip as in positions E, F and G. The rails 41 are in vibration shown by the phantom position in FIG. 1 which in FIG. 3 is depicted as vibration 75'; as the upper end of the rails 41 rest on coil spring 28' while the lower end is dampened by an overriding damper such as a neoprene cushion. This causes the nails, of course, to move from position C through D, E, F and G; the nail increasingly tipping. The vibratory motion 75 causes the nail head to rotate 59, whereby the chord 35 becomes the leading edge of the nail, position G. At position H, the nail head moves from the discharge end of rails 41 onto receiving end of elevator 50.

The down elevator 50 is rigidly mounted on a frame, not clearly seen, and little or no vibratory motion is imparted to it. It consists of a lower U-shaped channel 51 having upward extending arms 52 and carrying a bed 53 thereon that acts as the tracking surface, as seen in FIG. 3, against which the tips 37 of the nails slide against, once they pass position D. The dimension therefore between the bed 53 and the extending rails 41' of the first run become progressively shorter, as seen in FIG. 3, and hence encourages the nails to rotate as seen in that figure and as eariler explained. The down elevator has an upper pair of rails 56 parallel to and superadjacent the U-shaped channel 51 and acts as the streaming guide for the downward conveyance, 55, of the nails while maintaining the nails in juxtaposed positon, as seen in the lower portion of FIG. 2 and in phantom in FIG. 4 during their total downward travel into the zinc bath 61.

The down elevator 50 along its lower extremity 57 is in the horizontal and is positioned to be submerged in the bath 60. From the submerged portion 57 the down elevator 50 is curved and extends out of the bath in an inclined fashion toward rails 41 to an upward junction 59, where the upper end of the upper rails 56 terminate while the U-shaped channel 51 transverse through a bend and extends beneath the parallel rails 41 with an ever increasing distance as seen in FIG. 3.

Referring to FIGS. 2, 3 and 4 therefore, the nails are tipped and while tipping rotation is imparted by arrow 59 to orient the chord 38 of each nail into the front leading edge while the next preceding one following immediately behind so that at the upper tip of upper most rail 56 (in conformity with transition point 59), the nail heads are placed in overlapping relation as seen in FIG. 2 and travel down the down elevator 50 toward the bath. As a tight parallel side-by-side array.

Figures 7, 8:
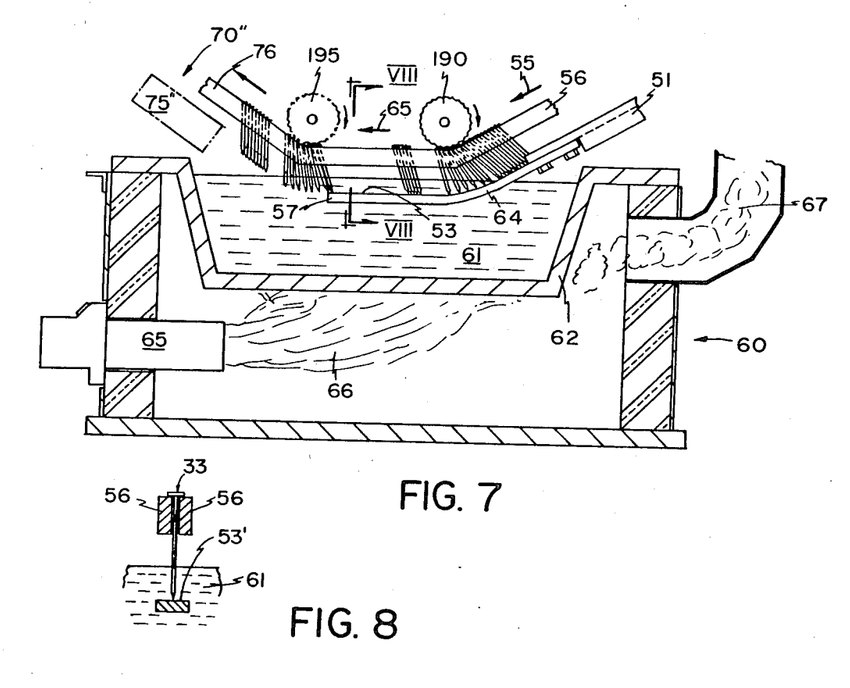
FIG. 7 is a sectional elevational view of part of the apparatus according to FIG. 1 that applied the liquid adhesive.
FIG. 8 is a section along lines VIII—VIII of FIG. 7.

Referring to FIG. 7 and the zinc bath 60, the molten zinc 61 floats in a heated recess 62 of the pot 60. The pot 60 is hollow and a gas fired furnace 65 has its fire 66 impacting the bottom of the recess 62 and the spent or flue gases 67 are expelled to the atmosphere. Since nails are generally steel, they may need to be cleaned prior to zinc being placed thereon; hence, and now referring to FIGS. 4, 5 and 6, the shank and tips of the nails go through a 3-step cleaning process; namely, an acid bath, at 120 in FIG. 4, a water rinse, at 130 in FIG. 4 which takes place in the upper portions of the down elevator, and a flux application step at 140 which takes place in the lower portions of the down elevator prior to the nails entering the zinc bath 61. Each of these steps includes the appropriate solution whether acid, water or flux being part of an endless stream which requires a separate feed reservoir, a circulating pump, communicating conduit, feed supply orifice 203 and a collection orifice 204.

Referring to FIGS. 3 and 4, the acid cleaning circuit is generally shown as 200 and is located beneath the second half run 1 and includes a reservoir 201, a circulating pump 202 which feeds the acid from the reservoir through conduit 203 to strike the underside at 204 of the nails depending through rails 41. The excess acid is collected by funnel 205 and directed into conduit 206 communicating with the reservoir 200. Thus the nails travelling down rails 41 have had their tips and a portion of their shanks acid cleaned. Any excess acid is conveyed back into the funnel by the inclilnation of the U-shaped channel 51.

After the transition 59, and referring to FIG. 4, the floor 53' has 4 orifices, 2 outflow orifices and 2 inflow orifices spacially disposed therealong. A water rinse circuit is generally shown as 130 and has an inflow conduit 132 which communicates upstream to the U-shaped channel 51 subjacent to the transition point 52. Water is pumped by a circulating pump (not shown) into the bed and flows downward to the left, then referring to FIG. 4, washing excess acid from the nails. Orifice 135 is defined by the bed 53 and the excess rinse water is collected by funnel 136 and conveyed by collection channel 137 to the supply. The cross-section FIG. 5 shows the flow of water through the channel 51. In fact, for full cleansing of the tip, the channel 51 may have a subchannel 51' therein in which the tips of the nails slide and it is in this subchannel 51' that the rinse water flows.

The flux cleaning circuit 140 is shown having a reservoir 141, circulating pump 142 and flux supply conduit 143 communicating downstream from the water collection orifice 154 but upstream from a flux collection orifice 145 similarly structured as the water collection orifice 135. Excess flux is collected by funnel 146 that communicates the flux back through collection conduit 147 to the reservoir 141. The flow of flux through the downstream portion of subchannel 51' is shown as 144 in FIG. 4.

Now referring to FIG. 7, the array of nails travel down the down elevator, and are washed and etched with the acid and then traverse into a horizontal path through a bend 64 in the elevator 50 and are pushed horizontally therealong by the sprocketed input control wheel 190 that preferably operates in synchronization with an outcarrying sprocketed control wheel 195 (shown in phantom). As seen in FIG. 7, the bed 53 extends from the lower terminus of the walls 51 inclinely downward through a bend into a horizontal to terminate at 56. The spacial dimension between the bed 53 and rails 51 is such that as they travel horizontally, 65, the nails are maintained at an inclined angle as shown. As nail tips beneath outcarrying wheel 195 fall off the end 57 they are spaced apart as shown in that figure and are fully and freely coated with molten zinc. The outwheel 195 moves them onto the lower segment of an up elevator 70 which is identical to the down elevator constructed with an upper pair of rails 76 and a lower U-shaped channel 71.

Along the up elevator at 75 is zinc blow-out station and, referring to FIGS. 7 and 11, at the zinc blow-out station, a low volume of airflow 75' is directed to strike the tips of nails as seen in FIGS. 10 and 11. In that respect, the channel is structured to define a linear slot 74 which communicates with the air supply conduit 75' while the U-shaped channel is flanged at the top at 72. Air 75', emanating from the air supply channel 75" strikes the nails, dislodging loose zinc and flinging them out as particles 75*. Because of the confining overhang of the flanges 72, very little, if any, air 75' will follow up the shank toward the nail heads and hence most of the air is ejected out of the slot 74'. The cross-sectional size of the slot is about 1½ inches long and about 1 inch high while the inside diameter of the conduit 75'''to about ½" with pressure between 5 to 8 PSI, that is reduced prior to blow-out and impact on the zinc coated nails. This impacting of air not only dislodges loose zinc, but also cools and solidifies the zinc coating each nail and provides an interspaced meniscus therebetween of approximately 0.006 inches.

Referring to FIG. 9, after leaving the zinc blow-out station 75, the zinc has solidified the nails into the rigid array and they travel under a counting wheel 82 integral with the counting station 80. The counting wheel 82 activates controller 83 and through hydraulic switch 84 a hydraulically controlled plunger generally shown as 92 which indexes in (see phantom 93) between 2 adjacently rigidly held nails to sever the nails into rigid parallel array or strip 300.

Referring to FIG. 12, it will be seen that the greater transverse dimension of each head of nails overlays that of the adjacent nail, that the nails are juxtaposed together, and that the solidified zinc forms a patch Z and acts as the bonding agent to hold the strip 300 in place. The strip 300 may then be placed in an appropriate driving device.

Those skilled in the art will appreciate that the embodiments of the invention may be changed without departing from the spirit of the invention as claimed.

The embodiments of the invention in which an exclusive property or privilege is claimed are defined as follows:

1. A method of arranging into a rigid parallel array, a plurality of uniformly formed rod-shaped fastener elements, such as nails, comprising the steps of:
    (a) conveying the said fasteners sequentially and spacially one behind the other along a first straight linear run;
    (b) orienting the elements in a common direction respectively parallel one to the other along said first run;
    (c) compacting the adjacent spacial distance of the elements so as to place adjacent elements into proximate, planar and parallel relationship;
    (d) immersing similar ends of the planar and parallel adjacent elements in a metallic bonding agent so as to form a meniscus therebetween; and,
    (e) solidifying the mensicus so as to form, into a rigid planar parallel array, a pluarlity of said elements.

2. The method as claimed in claim 1, wherein step (d) immerses the shanks in a molten metal.

3. The method as claimed in claim 1, wherein step (d) immerses the shanks in molten zinc.

4. The method as claimed in claim 1, including a step prior to the conveying step (a) of sequentially collecting individual rod-shaped fasteners, from the output of a rod-shaped fastener element fabricating device and directing the elements one by one toward the first linear run.

5. The method as claimed in claim 1, wherein the compacting step (c) places the elements in juxtaposed parallel relationship.

6. The method as claimed in claim 1, wherein the rod-shaped fastener elements have heads at one end which are of larger transverse dimension than a cylindrical shank which depends therefrom while the compacting step (c) includes the steps;
    (i) arranging the elements so as to depend, in an adjacent parallel relationship from said run; and,
    (ii) progressively tilting each advancing element into a predetermined angle so that the head of each element leads the shank of the same element and the head of a preceding adjacent element moves to overlay the head of a succeeding element.

7. The method as claimed in claim 1, wherein the rod-shaped fastener elements have heads at one end which are larger transverse dimension than a cylindrical shank which depends therefrom while the compacting step (c) includes the steps;
    (i) arranging the elements so as to depend, in an adjacent parallel relationship from said run; and,
    (ii) progressively tilting each advancing element into a predetermined angle during its travel along the first run, so that the head of each element leads the shank of the same element and the head of a preceding adjacent element to overlay the head of a succeeding element,
    (iii) inclining the first run in downward manner; and,
    (iv) vibrating the first run to induce travelling movement of the elements downwardly along the first run.

8. The method of claimed in claim 1, including an intermediate step interposed between the compacting step (b) and immersing step (c); namely, applying a suitable flux to each of the elements so as to enhance, the bonding to the elements of the bonding agent.

* * * * *